No. 649,841. Patented May 15, 1900.
H. K. HESS, A. J. SHINN & C. HERING.
PROCESS OF OPERATING TWO LIQUID PRIMARY BATTERIES AND REGENERATING ELEMENTS THEREOF.
(Application filed Dec. 6, 1899.)
(No Model.)
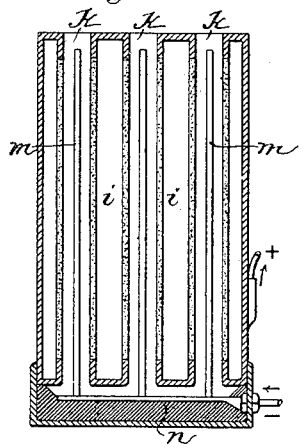
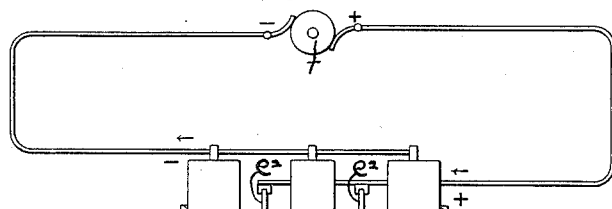
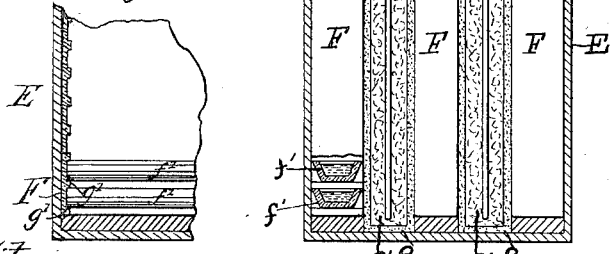
Witnesses:
Inventors:
Henry K. Hess
Albert J. Shinn
and Carl Hering
by their Attorneys
Howson & Howson

United States Patent Office.

HENRY K. HESS, ALBERT J. SHINN, AND CARL HERING, OF PHILADELPHIA, PENNSYLVANIA, ASSIGNORS TO HERMAN J. DERCUM, TRUSTEE, OF SAME PLACE.

PROCESS OF OPERATING TWO-LIQUID PRIMARY BATTERIES AND REGENERATING ELEMENTS THEREOF.

SPECIFICATION forming part of Letters Patent No. 649,841, dated May 15, 1900.

Application filed December 6, 1899. Serial No. 739,432. (No specimens.)

*To all whom it may concern:*

Be it known that we, HENRY K. HESS, ALBERT J. SHINN, and CARL HERING, citizens of the United States, and residents of the city of Philadelphia, Pennsylvania, have invented certain Improvements in Processes of Operating Two-Liquid Primary Batteries and Regenerating the Active Elements Thereof, of which the following is a specification.

Our invention relates to certain improvements in primary batteries of the type commonly known as "two-liquid" batteries, in which the cells are separated by porous partitions, the alternate cells containing the depolarizing agent and the other cells containing the excitant liquid and the anodes. In one form of this battery chromic acid is used as the depolarizing agent, dilute sulfuric acid is used as the excitant, and zinc plates as the anodes.

One object of our invention is to improve the method of operating a two-liquid primary battery by combining the elements of the two liquids—in the present instance the sulfuric acid and chromic acid—so that the liquid can be used first as a depolarizing agent and after the chromic acid has been reduced to use the sulfuric acid as an excitant; and a further object is to regenerate the exhausted liquid, as fully described hereinafter, whereby the liquid is brought back to its original condition to be utilized again as the depolarizing agent of a primary battery.

In the accompanying drawings, Figure 1 illustrates one form of battery in which our invention may be carried out, and Fig. 2 is a view of one form of regenerator. Fig. 3 is a fragmentary sectional detail hereinafter referred to.

The battery consists of a casing which is divided, by means of porous partitions, into a series of compartments. The alternate compartments $i$ are for the depolarizing liquid, while the compartments $k$ contain the excitant and the zinc plates in the present instance. These zinc plates $m$ rest upon a terminal plate $n$, forming one terminal of the battery, the casing forming the other terminal. It will be understood, however, that other forms of batteries may be used in carrying out our invention.

In order to make a successful primary battery, it is essential that the depolarizing and excitant liquids should be regenerated and the zinc recovered. A number of experiments have been tried to accomplish this in an economical manner, and we have found that by the use of a single liquid having the two essentials, so as to act first as a depolarizing agent and then as an excitant, the liquid can be readily regenerated and the zinc recovered, making a complete cycle.

We will describe our invention in connection with the ordinary two-fluid chromic-acid battery. The two fluids ordinarily used are chromic acid or its equivalent and dilute sulfuric acid, the chromic acid being the depolarizing agent and the dilute sulfuric acid the excitant. The two liquids are separated by means of a porous cup or plate in order to keep the oxidized or red chromium from coming in contact with the zinc. After exhaustion each of these two liquids may be generated so as to become just as active again as they were in the first instance were it not for the fact that there is some diffusion of each liquid into the other through the porous cup or plate, and each is therefore contaminated by the other. This takes place at each successive discharge and during each regeneration, and consequently the two liquids tend to become alike, each losing some of its active material in doing so. We overcome this serious objection by making both solutions alike, in that both contain acid and chromium compounds. The only difference between the two solutions is that the chromium compound in the depolarizing solution is in the oxidized or red chromic acid state, while in the exciting solution it is in the reduced or green chromium sulfate state. As the solutions are thus approximately alike in composition, they do not contaminate each other by diffusion as much as in the usual methods. The sulfuric acid of the liquid which is used as a depolarizing agent is for the most part chemically inactive, while the chromium sulfate of the liquid used as the excitant is chemically inactive. Thus there is a certain amount of dead-weight carried by the battery; but this is compensated for in the saving in transportation and regeneration.

It will be seen that we are able to use a single solution of the same composition, first using the solution in one compartment and then when the chromium is exhausted transferring this solution to the other compartment, and finally regenerating this single solution, bringing it back to its original condition for use in the first-mentioned or depolarizing compartment.

While there is a certain amount of the material forming the solution lying dormant in each compartment, by using it as above described the entire solution is utilized, and a single solution can be transported back for regeneration and returned again after regeneration instead of the practice heretofore employed of transporting the solutions from both compartments. Thus we save in transportation alone one-half the weight, which is a big item in battery service.

In the use of the regeneration process in a primary battery only the liquids have to be forwarded to a central station and returned after being regenerated, and by our process we only transport one-half the liquid, thus materially reducing the expense, and, furthermore, this method enables the whole combined process of discharging and regeneration to become a perfect cycle, no matter what the diffusion is, and it enables us to use all the ingredients as active materials.

It will be understood that the same solution is used first as a depolarizer and then as an exciter. The proportions should be such that the chromic acid corresponds to the same number of ampere hours of output as the sulfuric acid. Both ingredients will then be completely exhausted in two equal discharges.

After the liquid has been used as an excitant and the sulfuric acid spent the liquid is then transported, as above described, to the regenerating-station, and there it is regenerated in any suitable manner. From a totally-exhausted liquid the zinc is first thrown out at the cathode or negative pole by the passage of a current through the solution, while at the anode a liquid containing reduced chromium, but freed from zinc by previous treatment, is being oxidized. The first-mentioned liquid is then transferred from the cathode-chamber to the anode-chamber, when the reduced chromium salt is now reoxidized, giving the two solutions necessary—namely, the red-chromium liquid for depolarizing and the free sulfuric acid for the excitant—so that the complete cycle is formed.

We will describe one form of regenerator that may be used in carrying out our invention.

Referring to Fig. 2, E is a container in which are two porous cups $e\ e$, in the present instance containing scrap-lead $e'$. $e^2$ is a lead terminal plate connected to the positive terminal of the dynamo I. F F are carriers on which are trays $f'$, containing mercury, the mercury forming the cathode of the regenerator. The carriers F may be supported by any suitable means—such as bottom pieces $g$, Fig. 2—and the trays $f'\ f'$ may be supported in the carriers in any convenient manner, such as by means of ledges $g'$, formed on the end walls of the carriers F, as shown in Fig. 3.

The reduced compound as taken from the exhausted battery is placed first in the cathode-chamber, and the separated zinc is collected in the mercury-cups. The liquid is then transferred to the anode-chamber, and the reoxidation of the green-chromium sulfate to chromic acid and sulfuric acid takes place in this anode-compartment, and the regenerated battery solution is then in condition to be used again as the depolarizer of a primary battery.

We claim as our invention—

1. The process herein described of using a liquid solution in a two-liquid primary battery, said process consisting in mixing a depolarizing agent and an exciting agent as a compound, using said compound first as a depolarizer until the depolarizing agent is reduced, then using said compound as an excitant until the excitant is exhausted, substantially as described.

2. The process herein described of operating a two-liquid primary battery, the same consisting in charging the anode-compartment of the battery with a mixture of a highly-oxidized metallic compound as a depolarizing agent and an acid excitant capable of combining with the product of the reduction of the depolarizer, said acid excitant being in excess of that needed for this purpose and after exhaustion of the depolarizer transferring the liquid to the cathode-compartment of the battery to act as an excitant, substantially as described.

3. The process herein described of using a liquid solution in a two-liquid primary battery, said process consisting in mixing sulfuric acid with a depolarizing agent, reducing the said depolarizing agent in the production of an electric current and then using said compound as an excitant until the excitant is exhausted, substantially as and for the purpose specified.

4. The process herein described of operating a two-liquid primary battery, the same consisting of charging the cathode-compartment with a mixture of chromic acid, or acidified salt thereof, and sulfuric acid, the former serving as a depolarizer and the latter serving in part to combine with the reduction product of the depolarizer and in part for subsequent oxidating action, and after oxidation of the depolarizer transferring the liquid to the anode-compartment of the battery to act there as an excitant, substantially as described.

5. The process herein described of using a liquid solution in a two-liquid primary battery, said process consisting in making a compound of oxidized chromium and sulfuric acid, using this solution as a depolarizing agent until the chromium compound is reduced, then using the said liquid as an excitant until the sulfuric acid is exhausted, substantially as described.

6. The process herein described of utilizing and regenerating a battery liquid containing a depolarizing agent and an excitant agent, said process consisting in first using the liquid in a two-liquid battery as a depolarizer, then using the liquid as an excitant, then transferring it to the cathode-chamber of an electrolytic cell, passing a current through it, thereby throwing out the metal that formed the anode of the battery upon said cathode, then transferring all or part of the liquid to the anode-chamber of the regenerator, and passing a current through it and thereby regenerating the liquid and bringing it back to its original oxidized state, substantially as described.

7. The process herein described of using a liquid solution in a two-liquid primary battery and regenerating the same, the said process consisting in mixing oxidized chromic acid and sulfuric, using the solution as the depolarizing agent until the chromic acid is reduced and then using the solution as an excitant until the free sulfuric acid is exhausted, then transferring it to the cathode-chamber of an electrolytic cell, passing a current through it thereby throwing out the metal that formed the anode of the battery upon said cathode, then transferring all or part of the liquid to the anode-chamber of the regenerator, passing a current through it and thereby regenerating the liquid and bringing it back to its original oxidized state, substantially as described.

In testimony whereof we have signed our names to this specification in the presence of two subscribing witnesses.

HENRY K. HESS.
    ALBERT J. SHINN.
    CARL HERING.

Witnesses:
 WILL. A. BARR,
 JOS. H. KLEIN.